United States Patent [19]

Konishi

[11] 3,890,103
[45] June 17, 1975

[54] ANTI-POLLUTION EXHAUST APPARATUS

[76] Inventor: Jinemon Konishi, 21-14, 1-chome Nakasakurazuka, Toyonaka Osaka, Japan

[22] Filed: Aug. 23, 1972

[21] Appl. No.: 282,990

[30] Foreign Application Priority Data

| Aug. 25, 1971 | Japan | 46-64950 |
|---|---|---|
| Aug. 25, 1971 | Japan | 46-64951 |
| Sept. 6, 1971 | Japan | 46-68794 |
| Oct. 12, 1971 | Japan | 46-80298 |
| Oct. 25, 1971 | Japan | 46-84551 |

[52] U.S. Cl. ............ 23/284; 23/288 F; 55/10; 55/87; 55/118; 55/122; 55/152; 55/228; 55/230; 423/532; 423/544; 423/558
[51] Int. Cl. ............ C01b 17/74; B03c 3/16
[58] Field of Search ............ 55/2, 5, 6, 7, 8, 10, 13, 55/14, 101, 108, 109, 113, 117, 118, 119, 120, 122, 127, 134, 136, 137, 149, 152, 154, DIG. 38, 230, 235, 236, 237, 238, 456, 458, 87, 220, 73, 228; 261/DIG. 26; 423/558, 512, 541, 544, 532; 23/260, 284, 288 F

[56] References Cited
UNITED STATES PATENTS

| 1,250,088 | 12/1917 | Burns | 55/13 |
|---|---|---|---|
| 1,828,646 | 10/1931 | Dantsizen | 55/DIG. 38 |
| 1,927,376 | 9/1933 | Schroder et al. | 261/DIG. 26 |
| 2,249,095 | 7/1941 | Swift et al. | 261/DIG. 26 |
| 2,304,178 | 12/1942 | Keyes | 423/558 UX |
| 2,306,425 | 12/1942 | Bevan | 423/558 |
| 2,332,647 | 10/1943 | Keyes | 423/558 |
| 2,717,770 | 9/1955 | Gibson et al. | 261/28 |
| 2,740,493 | 4/1956 | Wintermute | 55/127 X |
| 2,931,458 | 4/1960 | Vane | 55/127 X |
| 2,935,375 | 5/1960 | Boucher | 55/107 UX |
| 3,155,472 | 11/1964 | Huppke | 55/178 |
| 3,218,781 | 11/1965 | Allemann et al. | 55/122 |
| 3,306,008 | 2/1967 | Silverman | 55/87 X |
| 3,443,362 | 5/1969 | Ebert | 55/149 X |
| 3,492,790 | 2/1970 | Ebert | 60/202 X |
| 3,622,270 | 11/1971 | Shah | 423/512 X |
| 3,656,441 | 4/1972 | Grey et al. | 110/8 R |
| 3,744,218 | 7/1973 | Ebert | 55/118 |
| 3,775,532 | 11/1973 | Shah | 423/541 X |
| 3,811,660 | 5/1974 | Cole, Jr. | 169/15 X |

FOREIGN PATENTS OR APPLICATIONS

| 1,337,379 | 8/1963 | France | 55/220 |
|---|---|---|---|
| 14,806 | 1915 | United Kingdom | 55/87 |
| 405,389 | 2/1934 | United Kingdom | 55/87 |
| 359,739 | 10/1931 | United Kingdom | 55/238 |
| 482,594 | 4/1938 | United Kingdom | 55/238 |

OTHER PUBLICATIONS

Spengler, Gunther, Report on Lecture Group B of the Congress "Reinhaltung Der Luft 1969", Staub–Reinhalt Luft Vol. 30, No. 2, February, 1970, pp. 5–12, 55–73.

*Primary Examiner*—Bernard Nozick
*Attorney, Agent, or Firm*—Littlepage, Quaintance, Murphy & Dobyns

[57] ABSTRACT

Apparatus for eliminating harmful or poisonous contaminants from exhausting gas is provided by making the exhausting gas enter into an exhausting chimney near a bottom thereof, the chimney having a diameter increasing proportionally with height. Dust is eliminated by the centrifugal force of a helically swirling ascending gas flow along an inner wall of the chimney. The dust with mist is ionized by corona discharge within the tower. The ionized dust is collected and then washed away by a fluid flow.

7 Claims, 9 Drawing Figures

ANTI-POLLUTION EXHAUST APPARATUS

BACKGROUND OF THE INVENTION

The present invention relates to an apparatus for eliminating harmful and poisonous components or contaminants from exhausting gases to prevent air pollution by combustion products of various fuels. Such combustion products may originate in industrial plants and/or factories.

Air pollution poses health and social problems of which the public is becoming increasingly aware. Much attention has been directed towards a method for treating exhaust gases to remove particulate contaminants such as dust, commonly exhausted from plants and factories, and gaseous contaminants, such as $SO_2$.

Chimney flue gas must be exhausted after treatment to separate noxious and/or toxic contaminants from the carrier gaseous fluid. However, adequate treating methods have yet to be devised.

SUMMARY OF THE INVENTION

The present invention provides apparatus for separating and eliminating harmful or poisonous contaminants in exhausting gases by treating the gases in an exhausting conduit, such as a chimney, by employing centrifugal separator, ionization, and washing apparatus.

Contaminated gas is introduced into the bottom of exhausting conduit means, such as a chimney. The inner diameter of the chimney increases in direct porportion to the height thereof. The inner surface of the exhausting chimney is configured to impart a swirling motion to vertically ascending hot gas in the chimney. Centrifugal force in the swirling gas causes heavy matter in the gas to impinge upon the inner surface of the chimney. Particulate matter in the gas is ionized by corona discharge and subsequently collected on a positive electrode. The collection means are washed with a fluid to remove the collected particulate matter. Alternatively, the collected particulate matter may be neutralized by a chemical reaction.

A first object of the present invention is to provide an exhausting conduit wherein the inner diameter increases in direct proportion to its height.

Another object of the present invention is to provide a gas cleaning apparatus with discharge and collection poles in the chimney for ionizing and attracting particulate matter in the gas.

A further object of the invention is to provide gas cleaning apparatus in which water spraying means cause collected contaminants to flow down along the inner surface of the chimney.

A further object of the invention is to provide gas cleaning apparatus in which water spraying means are mounted in gas inlet means and/or near a top of the chimney.

A further object of the present invention is to provide a gas cleaning device with swirling means for inducing or imparting an upward swirling motion to rising gas for separating heavy components from the gas.

A still further object of the present invention is to provide apparatus for effectively eliminating harmful or poisonous components in exhausting gases by contacting contaminants in the gases with electrical separation means and liquid cleaning means.

Other object of the present invention will become clear from the foregoing and ongoing specification, the claims, and the drawings.

DETAILED DESCRIPTION OF THE FIRST PREFERRED EMBODIMENT

Figure 1:
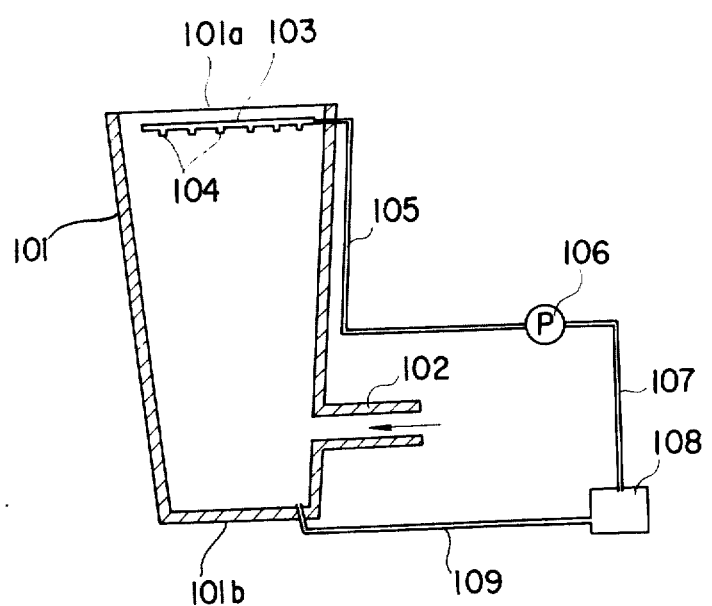
FIG. 1 is a schematic sectional view of the first embodiment according to the present invention.

In FIG. 1, reference numeral 101 shows conduit means, such as an exhausting chimney. Chimney 101 may be of concrete, hume, metal (stainless steel, copper, or the like), plastic, or heat insulated brick. Chimney 101 is generally in the shape of a frusto-conical tube, with a plane portion cut at the top, having a larger diameter at the upper portion 101a and at the lower portion 101b. Chimney 101 has gas inlet means 102 near the bottom thereof. Such gas inlet means may normally be a pipe suitably connected to chimney 101. Spraying means 103 are positioned near the upper portion of the exhaust chimney 101. Spraying means 103 has nozzles 104 circumferentially mounted along the inner surface of the chimney. Spraying means 103 is supplied with liquid in tank 108 via pipe 107, pump 106, and pipe 105. The liquid in tank 108 is preferably water, some other gas absorbable liquid, or a liquid soluble with the gas. Pipe 109 returns liquid from the bottom of chimney 101 to tank 108. Thus, liquid in the system is caused to recirculate. Tank 108 is also equipped with a filling access opening (not shown) to receive fluid, such as water, from outside the system when necessary. Pipe 109, which permits recirculation of the fluid, is not always necessary, for equal effect is obtained when fresh water is used without recirculation.

The operation of the exhaust chimney in the first preferred embodiment is as follows:

Exhausted gas introduced into the exhaust chimney 101 through inlet means 102, ascends upward in chimney 101, and is exhausted into the air from an upper portion thereof, 101a. Water from tank 108 is sprayed through nozzles 104 into the ascending exhaust gases. The liquid cascades down along the inner surface of chimney 101, forming a moving liquid film on the inner surface thereof which washes the inner surface of the chimney. This liquid may vaporize under the influence of high temperatures, say, several hundred degrees centigrade, of the exhausting gases. In such case, small particles, such as dust, adhere to the bottom portion of the inner periphery of the exhausting tower because of their wetted increase in density. Wetted dust adhering to the inner surface of chimney 101 is washed down by a cascading fluid flow along the inner surface of chimney 101. Such fluid flow forms a fluid film on the surface of chimney 101, of which thickness becomes of larger one down along the chimney. The formed film washes the dust advantageously and comes into effective contacts with the exhausting gases to vaporize therewith. Such washing fluid may be removed from chimney 101 via pipe 109 and recirculated. The lower portion of chimney 101 may be configured to impart a helical swirl to the ascending gas. The helical swirl offers the benefit of retaining the gas within the tower for a long time, resulting in effective elimination of the contaminants and dust.

DETAILED DESCRIPTION OF THE SECOND PREFERRED EMBODIMENT

Figure 2:
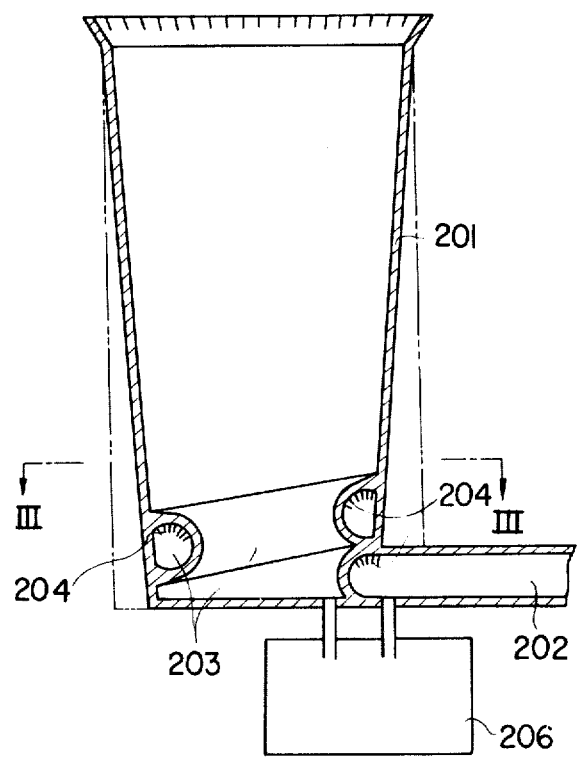
FIG. 2 is a longitudinal sectional view of the second embodiment according to the present invention.
Figure 3:
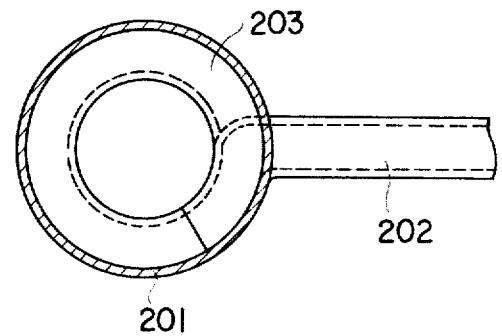
FIG. 3 is a sectional view cut along line III—III in FIG. 2.

FIGS. 2 and 3 show a variation of the first preferred embodiment. The exhausting chimney reappears in FIG. 2 as numeral 201. Gas inlet means 202 are suitably connected to chimney 201. Helical pipe 203 is wound in chimney 201 near a lower portion thereof and is communicatively connected to gas inlet means 202. In the embodiment shown in FIG. 2, reference numeral 204 represents the water spraying nozzles, corresponding to reference character 104 of FIG. 1. In the second preferred embodiment, it will be noted that the water spraying nozzles are disposed in helical pipes 203. In operation, exhaust gas enters chimney 201 via inlet means 202 and pipe 203. Water is sprayed onto the exhausting gas via nozzles 204 as the gas ascends the chimney through pipe 203. At elevated temperatures the particulate matter is wetted by steam created by vaporization of the water. In this embodiment in which water is sprayed onto the exhaust gas inside gas inlet means, contact between gaseous phase substances and liquid phase substances is made more closely than that in the embodiment 1. Tank 206 provides a supply of fluid for the system illustrated in FIG. 2.

FIG. 3 is a sectional view cut along line III—III of FIG. 2. FIG. 3 shows chimney 201, inlet means 202 and helical swirling pipe 203 from a top vantage point.

DETAILED DESCRIPTION OF THE THIRD PREFERRED EMBODIMENT

Figure 4:
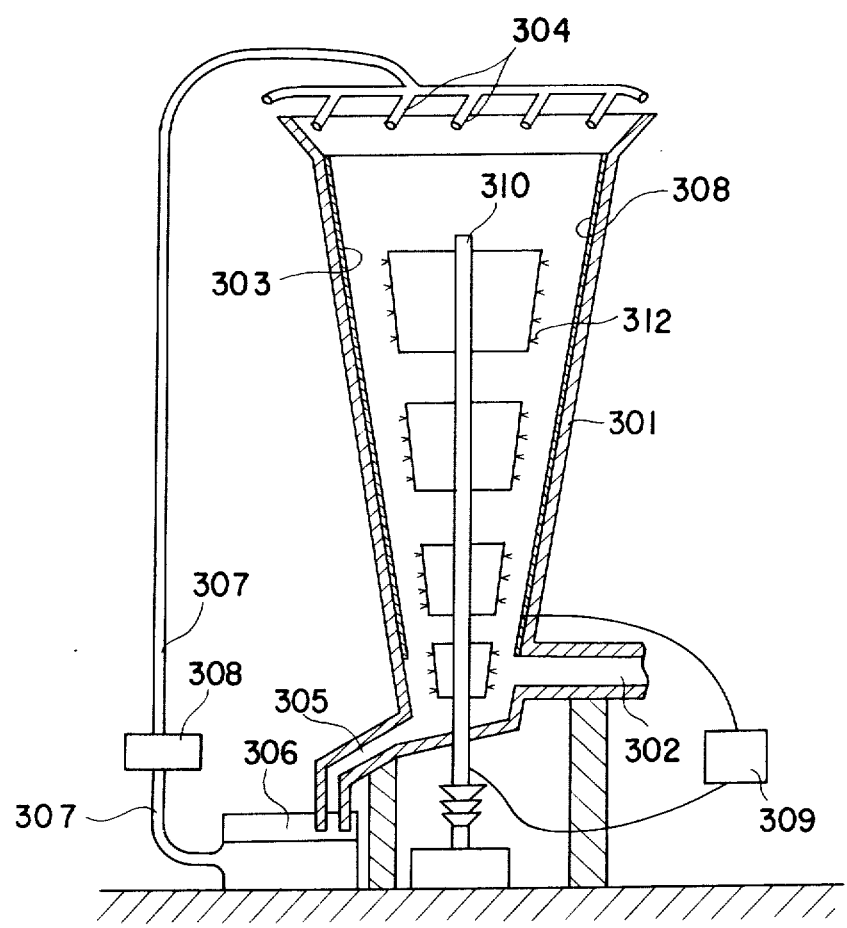
FIG. 4 is a schematic sectional view of the third embodiment of the present invention.

FIG. 4 illustrates a third preferred embodiment of the present invention in which chimney 302 corresponds to chimney 101 in FIG. 1. FIG. 4 shows chimney 301 as being an upwardly opening, outwardly tapering frusto-conical tube to which inlet means, such as pipe 302, are suitably connected to permit exhaust gas to enter the chimney. Spraying means has nozzles 304 positioned on the chimney near the uppermost opening thereof. Nozzles 304 are connected to tank 306 via pipes 307 and pump 308. Nozzles 304 jut out with an inclination angle of a degree ranging within 90° with respect to the perpendicular line of the chimney, with their openings being directed to the inner surface of the chimney. The liquid jet from the nozzles flows down along the inner surface of the chimney in helical swirls to eventually form a liquid film therealong. Such liquid film renders it possible to create a good contact between the exhaust gas and the washiing liquid. As a result, the washing is carried out with a reduced amount of the liquid as compared with the consumption in straight-down flow system. FIG. 4 shows the inner surface of chimney 301 to be lined with electrical means, including second pole means 303 for collecting ionized particles. When the exhaust chimney 301 is made of metal and the inner surface itself is smooth, the need for a separate second pole 303 is eliminated and the smooth inner surface itself acts as the collection pole. Reference character 310 represents a first pole means, such as an electric discharge pole across which a high voltage may be supplied by potential 309, relative to the collection pole 308. Pole 310 has a plurality of electric discharge chips 312 and FIG. 4 spaced equidistant from collection pole 303. Corona discharge occurs between electric discharge chips 312 of first pole 310 and collection pole 303.

Gas enters the apparatus of FIG. 4 through inlet means 302. Fluid, such as water, is supplied from tank 306 by pump 308 and pipes 307 to nozzles 304. The water is sprayed from the nozzles into the ascending flow of gas. At elevated temperatures of the exhaust gas the water vaporizes into steam. The steam mixes with and wets the gas, entraining harmful and corrosive contaminants in the gas, such as $SO_2$, $SO_3$, $Cl_2$, HCl, etc. The mist is ionized by corona discharge between electric discharge chips 312 and pole 303 which causes contaminants to adhere to the contaminant collecting poles 303. The adhered contaminants on the inner surface of collecting poles 303 are washed away continuously by a cascading flow of water from nozzle 304. The wash water, containing contaminants, is directed to tank 306. The liquid in the system may be water but, more effectively, a liquid is used which absorbs contaminants, or combines chemically with contaminants, or is soluable with the contaminants.

The embodiment of FIG. 4 may also be provided with swirling means (not shown) located near a lower portion of chimney 301 for imparting a swirling motion to vertically ascending gases. Such swirling motion causes heavy contaminant in the gases to impinge upon collection poles 303.

The particular shape of the exhausting chimney performs a useful function. The imparted helical swirl of the gas begins to slow as the gas rises in the chimney due to the increasing diameter of the tower at high elevations. At slower speeds of vertical ascension caused by swirl the gas is retained within the chimney and subjected to longer periods of ionization. As a result, particulate matter may be effectively collected on the surfaces of collection plate 303.

Figure 5:
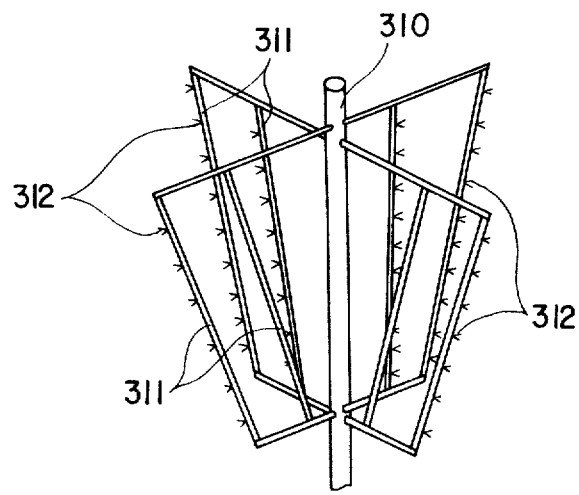
FIG. 5 is a perspective view of the electric discharge pulls in FIG. 4.

FIG. 5 is a perspective view of the electric discharge pole in FIG. 4. FIG. 5 more clearly shows the chips 312 positioned on members 311.

Figure 6:
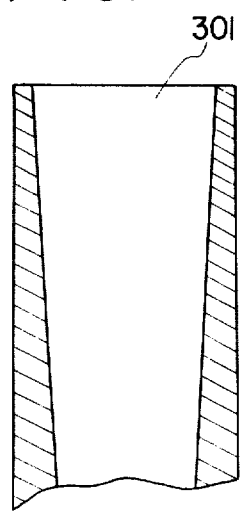
FIG. 6 is alternative embodiment of the exhausting conduits in FIG. 4.

FIG. 6 shows an alternative embodiment of the chimney 301 in which the tube has a constant outer diameter and a progressively increasing inner diameter. It should be noted that while the internal chimney configuration is important, the external shape is of no consequence.

DETAILED DESCRIPTION OF THE FOURTH PREFERRED EMBODIMENT

Figure 7:
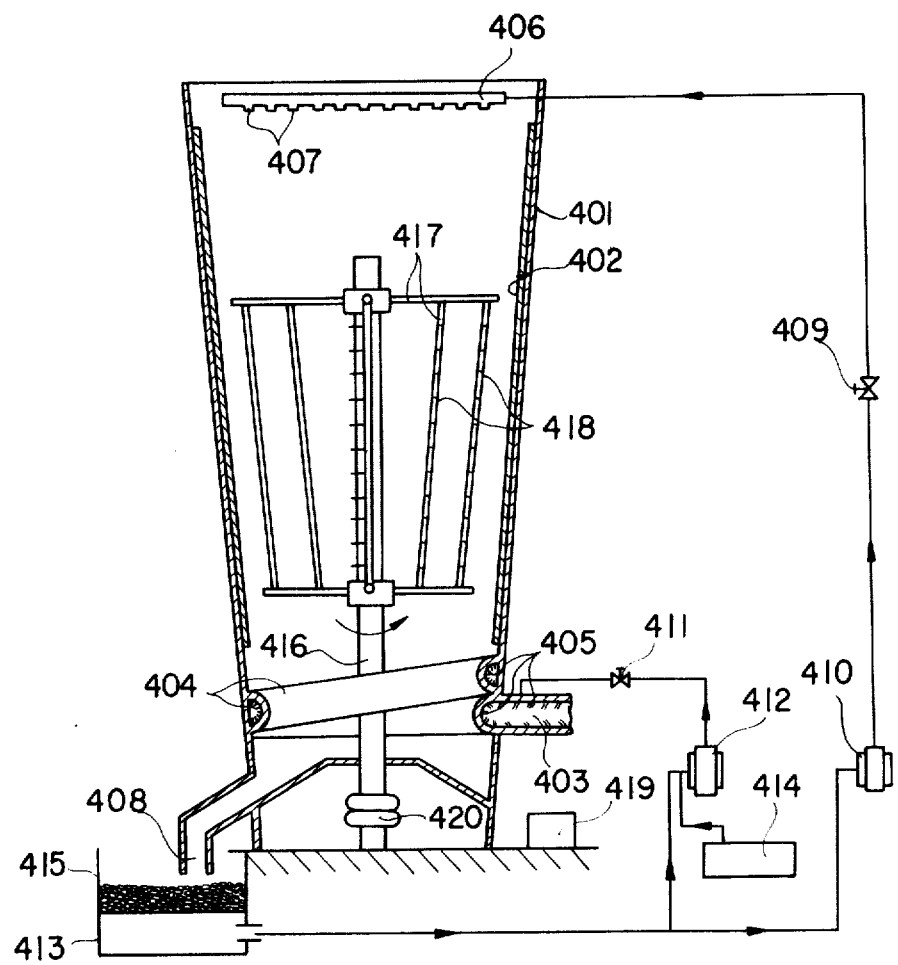
FIG. 7 is a schematic sectional view of the fourth embodiment of the present invention.

FIG. 7 shows a fourth preferred embodiment of the present invention in which reference numeral 401 represents conduit means, such as a chimney, for exhausting gases. On the inner surface of the tower 401 is mounted a dust collection pole 402. As the lower portion of the tower 401 is provided a exhausting gas inlet duct 403 extending into the tower along the inner surface thereof. This extended portion of the duct forms a helical duct portion 404, which is formed for the inner discharge of the exhausting gas.

At the uppermost portion of the inner surface of the exhausting tower 401 is mounted a pipe 406 with an adapted shape along the inner periphery surface of the exhausting tower for the purpose that water or other liquid may flow on the inner surface of the exhausting tower. The pipe 406 has many nozzles 407 spaced at a predetermined distance. The pipe 406 is communicated with an output side of a pump 410 via a flow quantity controlling valve 409.

On the other hand, the exhausted gas inlet duct 403 and the duct helical portion 404 have each a pipe (not shown) along the exhausted gas inlet 403 and the duct helical portion 404 respectively. The pipe is equipped with many nozzles 405 which are opened towards inner surfaces of the said exhausted gas inlet duct 403 and a duct helical portion 404. This pipe is communicated to the output side of the pump 412. At the lower portion of the duct helical portion 404 is mounted an adequate exhausting outlet (not shown in the drawings).

The input sides of the pump 410 and the foam pump 412 are equally communicated to the bottom portion of the dust collecting tank 413. The input side of the foam pump 412 is communicated to the output side of an air compressor 414 and water and are mixed in the air foam pump 412.

In the dust collecting tank 413 is included such reduction materials 415 as waste iron which reduces the exhausted water from the undermost exhausted water outlet 408 of the exhausting tower 401.

In the exhausting tower 401 is mounted a rotating shaft 416 in the free state to rotate, on which a frame 417 is set. On the frame 417 are equipped many discharge chips 418 directing to the tangential line to the arc of the circle the center of which is the rotating shaft 416.

The rotating shaft 416, the frame 417 and the electric discharge chip 418 are all made of metal, and about 150 KV high electric voltage of d.c. is applied between these and the dust collecting pole plate 402 by electric high voltage source 419. As to the nature of the pole, the side of the dust collecting pole plate 402 is plus. Numeral 420 denotes an insulator for the high voltage insulation.

The exhausted gas from the exhausted gas inlet 403 goes upwards slowly up to the upper end of the exhausting tower 401, swirling along the helical swirling portion 404. But, the swirling exhausted gas receives air-water foam splashing from the nozzle 405 when the swirling gas is in the exhausted gas inlet duct 403 and the duct helical swirling portion 404 and the exhausted gas is cooled, at the same time a part of the air-water foam becomes steam. The mixed gas composed of the exhausted gas from the duct of helically swirling figure 404, air and steam is further cooled by receiving water from the nozzle 407 and generates steam.

Between the electric discharge chip 418 and the dust colleting pole plate 402, electric discharge is always taking place, the aforesaid mixed gas composed of the exhausted gas, air and steam passing through this discharge zone, where $O_2$ included in the foam is partially changed into $O_3$ by corona discharge. This steam, $O_2$ or $O_3$ generated in the exhausting tower reacts with $SO_2$ gas which is one of the poisonous gases in the exhausted gases as follows and changes the $SO_2$ gas into $SO_3$, $H_2SO_3$ and $H_2SO_4$ particles.

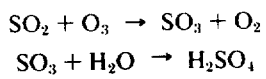

$$SO_2 + O_3 \rightarrow SO_3 + O_2$$
$$SO_3 + H_2O \rightarrow H_2SO_4$$

when there are air and water, the reactions

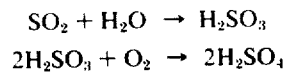

$$SO_2 + H_2O \rightarrow H_2SO_3$$
$$2H_2SO_3 + O_2 \rightarrow 2H_2SO_4$$

and

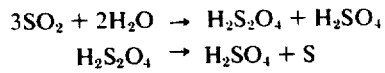

$$3SO_2 + 2H_2O \rightarrow H_2S_2O_4 + H_2SO_4$$
$$H_2S_2O_4 \rightarrow H_2SO_4 + S$$

are proceeded.

The above mentioned reactions are accelerated at comparatively low temperatures, while in this apparatus the mixed gases and others are sufficiently cooled by water which constantly flows on the inner surface of the dust collecting pole plate 402 and the foam from the nozzle 405 in the exhausted gas inlet duct 403 and the helically swirling duct portion 404. Therefore, $SO_2$ gas, as shown in the above mentioned reaction formulas, is easily turned into the particle of $SO_3$, $H_2SO_3$ or $H_2SO_4$.

The other harmful and poisonous components are combined with steam and become mist particles which are ionized by the electric discharge taking place between the dust collective pole plate 402 and the electric discharge chip 418 with the particles of above mentioned $SO_3$, $H_2SO_3$ and $H_2SO_4$. The rotating shaft 416 mounted with electric discharge chips 418 via the frame 417 is slowly rotated owing to the reaction force produced in the discharge. According to the rotation of the rotating shaft 416, the electric discharge between the dust collecting pole plate 402 and the discharge chip 408 is taken place with migration and mixing of the exhausted gases, the ionization rates become very high and dense, and the ionized particles are adhered to the inner surface of the dust collecting pole plate 402. The particles adhered to the dust collecting pole plate 402 are washed away constantly by the water flowing down on the inner surface of the dust collecting pole plate 402, and enter into the dust collecting tank 413. The water which enters into the dust collecting tank 413, is reduced by the reducing agent 415 and filtered. The water after being reduced and filtered in collecting tank 413 is recirculated by pumps 410 and 412 as previously described and illustrated by FIG. 7.

If necessary, an auxiliary motor may be equipped for giving a rotation force to the rotating shaft 416, and such neutralization agents as NaOH, $NH_3$, etc., may be added to the water flow on the dust collecting pole plate 402.

In the above described embodiment, the spraying of the foam is done in both the exhausted gas inlet duct 403 and the helical duct portion 404, or in either the exhausted gas inlet duct 403 or the helical duct portion 404, that is to say only in one duct.

As stated above, in this embodiment, the exhausted gas is made to go upwards swirling helically in the exhausting tower and air-water foam is sprayed in the exhausted gas inlet duct or in the helical duct portion or in the both ducts therefore this apparatus in this example has an effective mixing function. The temperature of the exhausted gas is very high and $SO_2$ gas in the exhausted gases and other harmful components are effectively combined with the steam from the foam to form minute particles, and these particles are ionized by the corona discharge, oxidized by O₃ produced through the corona discharge, adhere to the dust collection pole plate, and are washed away by the water from the upper portion of the exhausting tower; the harmful and poisonous components are thus never expelled into the air.

As the air-water foam is used as the liquid in the helical pipe, the combination with the harmful and poisonous components in the exhausted gases become much easier than in the case where mere liquid only is used, and further as the O₃ generating ratio in the exhausting tower becomes very high. The SO₂ gas is effectively eliminated by the apparatus in the example which has also have the effect of minimizing the pressure drop loss in the exhausting tower.

DETAILED DESCRIPTION OF THE FIFTH PREFERRED EMBODIMENT

Figure 8:
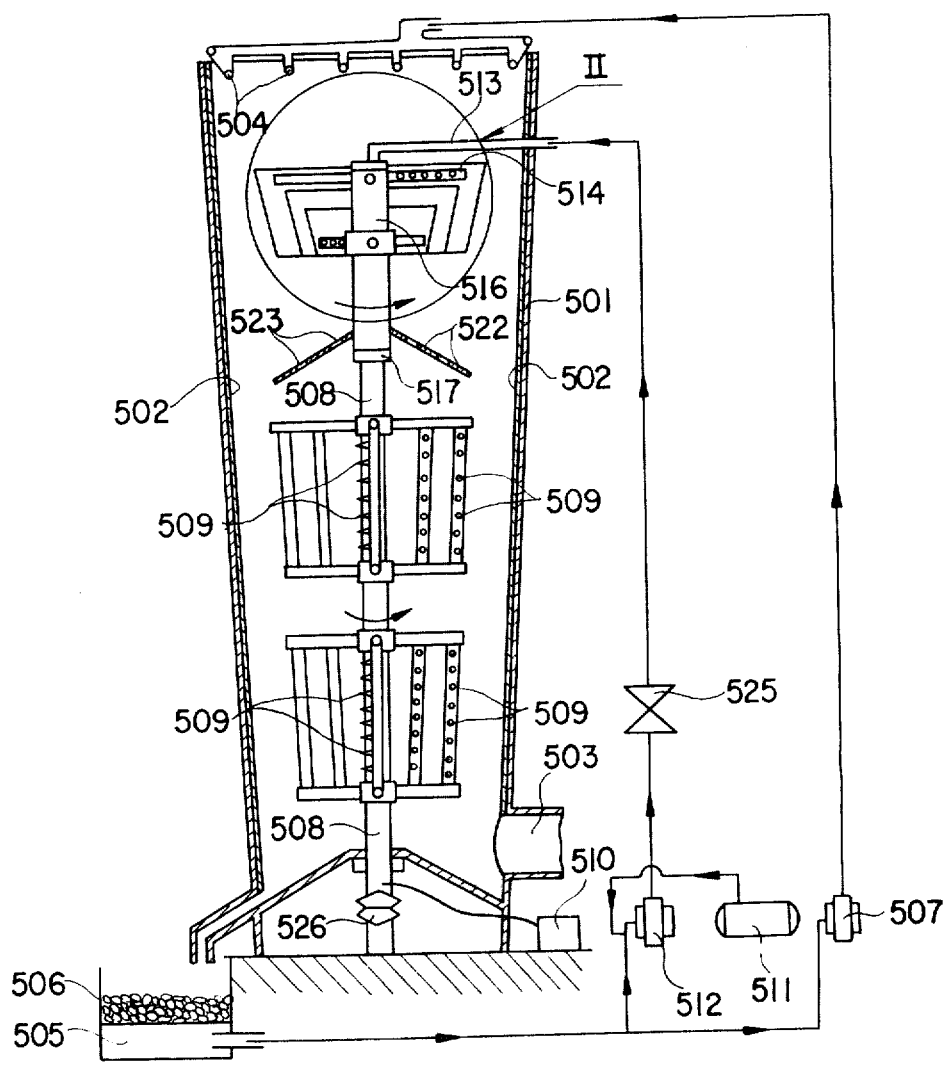
FIG. 8 is a schematic sectional view of the fifth embodiment of the present invention.

FIG. 8 shows a fifth preferred embodiment of the present invention. Conduit means, such as a chimney, are identified by reference character 501. Similar to other described embodiments reference character 502 represents a positive ion collection pole or electrode. Ionization means 503, such as a negative corona discharge electrode, are mounted on rotating shaft 508. Gas inlet means 503 are suitably connected to a lower portion of chimney 501 for permitting contaminated gas to enter the chimney. Electric discharge chips 509 are mounted on the suitable frame structure to maintain an equidistant, spaced relationship from collection pole 502.

Fluid is withdrawn from tank 505 and is pumped by pump 507 to spraying means, such as nozzles 504, mounted at a top of the chimney. Such fluids may be sprayed onto gas in the chimney or may be caused to cascade down pole 502, washing same, and directed to flow into collection tank 506 containing a suitable reducing agent. The reducing agent serves to remove contaminant material by chemical reduction and allow fluid to flow into tank 505. FIG. 8 also illustrates that fluid from tank 505 may be pumped by pump 512 in conjunction with air compressor 511 through valve 525 and into structure generally shown by reference character II. The particular structure of II is more fully described in conjunction with FIG. 9. Insulator 526 electrically insulates the negative discharge poles 509 from the positive pole 502. Umbrella 522 serves to reduce contact of sprayed or cascading water with negative corona discharge poles 509. Insulator 517 electrically insulates the negative discharge poles 509 from the structure indicated by reference character II.

Figure 9:
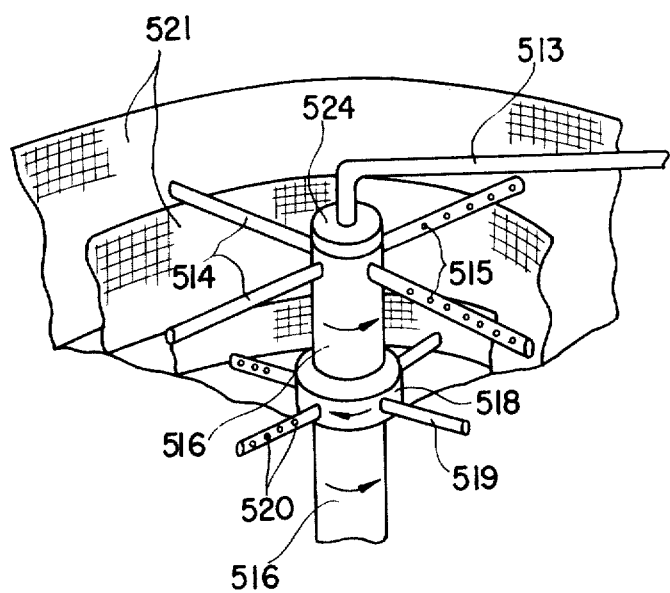
FIG. 9 is a perspective view of the water spraying devices of FIG. 8.

FIG. 9 illustrates more particularly the structure shown enclosed by II in FIG. 8. Water, or other fluid, withdrawn from tank 505 is pumped by pump 512 in conjunction with compressed air from compressor 511 to produce an air foam in water. The water with air foam is pumped to flow water rotator 514 having a plurality of radially extending arms each containing holes 515 on one lateral side to produce rotation of the flow water rotator 514 in the same direction as shaft 516. Flow water rotator 514 is thus caused to rotate by a jet action of foam escaping through holes 515. The air-water foam from pipe 513 is also directed to freely rotatable ring 518 also having a plurality of radially extending arms having holes 520 disposed on an opposite side with respect to flow water rotator 514. Thus, rotating ring 518 counterrotates with respect to flow water rotator 514 in a direction opposite that of the rotating shaft 516. The structure above described is surrounded by net 521 which rotates in the same direction as rotating ring 518. Preferably, net 521 is constructed of a material which acts as a catalyst in a gas reaction. The operation of the fifth preferred embodiment is as follows:

Contaminated gas, particularly the one containing SO₂ or other poisonous gases, are introduced into chimney 501 through inlet means 503. Water is sprayed from nozzles 504 and is caused to cascade down along pole 502. Water, subjected to air pressure from compressor 511 creates an air-water foam which is pumped by pump 512 to the flow water rotators to create a fine mist. A portion of water from holes 520 as mixed with foam is not only effectively vaporized at the elevated temperatures of the exhaust gas to create the mist easily reactable with contaminants in the gas, but also cools the exhaust gas. Corona discharge takes place between chips 509 and poles 502 due to a high voltage d.c. applied by voltage source 510. Oxygen in the air may be converted into O₃ by the corona discharge. Steam, O₂ gas, and O₃ gas produced in the conduit means react chemically with contaminants in the escaping gas to convert such contaminants to SO₃, H₂SO₃, and H₂SO₄.

Other contaminants in the escaping gas as well as dust and/or mist are ionized and collected on pole 502 which is continually washed with cascading water from nozzles 504. Thus, the contaminants which are collected on pole 502 are directed to tank 505 containing material for filtering the wash water and trapping the collected particles.

Thus, the apparatus described in each of the five preferred embodiments has the principle advantage of discharging relatively cool gas into the air and collecting contaminant matter within the exhausting chimney.

The particular shape of the exhausting chimney promotes a high velocity helical swirl in a bottom of the chimney which gradually slows as the gas ascends. As a whole, the gas is retained within the chimney for a longer period. The chimney configuration also has the advantage of permitting water to cascade down the inner surface thereof for washing and cleaning the chimney. The apparatus permits continuous operation without the need to periodically shut down and clean the chimney. A further advantage of the invented apparatus exists in synergistic purification of the exhausting gas made by use of the liquid. Steam generated by contact of the exhaust gas of the elevated temperatures with the liquid entrains harmful components in the gas.

It will be understood that various changes in the details, materials, and arrangement of parts, which have been hereabove described and illustrated in order to explain the nature of the invention, may be made by those skilled in the art within the principle and scope of the invention as expressed in the foregoing specification, the drawings, and in the claims.

What is claimed is:

1. A pollution-reducing exhaust apparatus comprising:
    a. a vertically oriented conduit having a frusto-conical inner surface with an inside diameter larger at an upper end than at a lower end,
    b. an inlet near the lower end of the conduit for allowing hot, contaminant bearing gas to flow from a source of the gas into the conduit, c. a first electrical pole axially mounted within the conduit for ionizing the contaminants,
d. a second electrical pole mounted on the inner surface of the conduit for collecting the ionized contaminants,
e. a source of liquid,
f. a source of compressed air,
g. a first spraying means positioned on the top of the first electrical pole, but elecrically insulated therefrom, and connected to the source of liquid and to the source of compressed air for spraying an air-liquid foam into the hot gas, the first spraying means comprising a first rotatably mounted rotator and a plurality of arms extending radially from the rotator, each arm containing a series of holes on one lateral side for producing rotation of the arms and rotator as the air-liquid foam is sprayed from the holes, and
h. a second spraying means located near the upper end of the conduit, connected to the source of liquid and directed toward the inner surface of the conduit for washing the second electrical pole and the inner surface of the conduit.

2. The apparatus of claim 1 wherein the first electrical pole further comprises a plurality of electrical discharge chips mounted on the first pole and spaced equidistant from the second pole for facilitating corona discharge between the first and second pole.

3. The apparatus of claim 1 further comprising an umbrella positioned between the first electrical pole and the first spraying means for reducing the contact of sprayed liquid with the first electrical pole.

4. The apparatus of claim 1 wherein the first spraying means further comprises a second rotatably mounted rotator and a plurality of arms extending radially from the second rotator, each arm containing a series of holes on an opposite side for producing rotation of the second rotator and arms in an opposite direction from that of the first rotator and arms as the air liquid foam is sprayed from the holes.

5. The apparatus of claim 4 wherein the first spraying means further comprises a net constructed of a catalytic material, rotatably mounted on the first pole and surrounding the first spraying means for catalytically reacting with the hot gas.

6. The apparatus of claim 1 further comprising a collecting tank for receiving the contaminants after they have been entrained in the liquid, the collecting tank including materials for chemically reducing and filtering the liquid received.

7. The apparatus of claim 6 wherein the liquid includes neutralization agents for neutralizing the entrained contaminants.

* * * * *